US010452941B2

(12) United States Patent
Luo et al.

(10) Patent No.: US 10,452,941 B2
(45) Date of Patent: Oct. 22, 2019

(54) SELF-CORRECTION RECOGNITION METHOD AND DEVICE FOR VALUABLE DOCUMENT RECOGNITION DEVICE

(71) Applicant: GRG Banking Equipment Co., Ltd., Guangzhou, Guangdong (CN)

(72) Inventors: Panfeng Luo, Guangdong (CN); Rongqiu Wang, Guangdong (CN); Mengtao Liu, Guangdong (CN); Dong Wei, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/567,567

(22) PCT Filed: Mar. 30, 2016

(86) PCT No.: PCT/CN2016/077873
§ 371 (c)(1),
(2) Date: Oct. 18, 2017

(87) PCT Pub. No.: WO2016/169404
PCT Pub. Date: Oct. 27, 2016

(65) Prior Publication Data
US 2018/0107889 A1 Apr. 19, 2018
US 2018/0276491 A9 Sep. 27, 2018

(30) Foreign Application Priority Data

Apr. 23, 2015 (CN) .......................... 2015 1 0198411

(51) Int. Cl.
G06K 9/32 (2006.01)
G06K 9/00 (2006.01)
(Continued)

(52) U.S. Cl.
CPC ....... G06K 9/3208 (2013.01); G06K 9/00463 (2013.01); G06K 9/186 (2013.01); G06K 9/32 (2013.01); G06K 9/6269 (2013.01)

(58) Field of Classification Search
None
See application file for complete search history.

(56) References Cited

U.S. PATENT DOCUMENTS 6,045,220 A * 4/2000 Kiyohara ............. B65H 3/5215
271/117
8,488,869 B2 * 7/2013 Limonov ............. H04N 13/178
382/154
(Continued)

FOREIGN PATENT DOCUMENTS

CN 101398689 A 4/2009
CN 101763404 A 6/2010
(Continued)

OTHER PUBLICATIONS

Extended European Search Report for Application No. EP 16782552.0 dated Apr. 11, 2018.
(Continued)

Primary Examiner — Nancy Bitar
(74) Attorney, Agent, or Firm — Wolf, Greenfield & Sacks, P.C.

(57) ABSTRACT

A self-correction recognition method and device for a valuable document recognition device is provided. The method includes: extracting a feature of a valuable document; determining whether the feature falls in a discriminant library of any preset category, and obtaining a substitutive centroid according to a feature centroid and the feature in a case that the feature falls in a discriminant library of any preset category; and updating the discriminant library of the category by replacing the feature centroid of the category with the substitutive centroid. The discriminant library is pre-
(Continued)

constructed according to the feature centroid of the category, and the feature centroid is calculated from a feature of the category.

13 Claims, 4 Drawing Sheets

(51) Int. Cl.
*G06K 9/18* (2006.01)
*G06K 9/62* (2006.01)

(56) References Cited

U.S. PATENT DOCUMENTS

| | | | | |
|---|---|---|---|---|
| 10,007,862 | B2* | 6/2018 | Gurwicz | G06K 9/6263 |
| 2008/0144942 | A1* | 6/2008 | Besley | G06K 9/00456 |
| | | | | 382/209 |
| 2009/0315977 | A1* | 12/2009 | Jung | H04N 13/178 |
| | | | | 348/42 |
| 2010/0014122 | A1 | 1/2010 | Massicot et al. | |
| 2012/0072995 | A1* | 3/2012 | Crawford | G06F 21/105 |
| | | | | 726/26 |
| 2014/0003741 | A1* | 1/2014 | Cui | G06T 7/30 |
| | | | | 382/298 |
| 2015/0256339 | A1* | 9/2015 | Voloshynovskiy | G06F 21/14 |
| | | | | 380/44 |
| 2016/0055700 | A1* | 2/2016 | Wang | G07F 19/202 |
| | | | | 271/314 |
| 2017/0260016 | A1* | 9/2017 | Tan | B65H 9/16 |

FOREIGN PATENT DOCUMENTS

| | | |
|---|---|---|
| CN | 103136529 A | 6/2013 |
| CN | 103646242 A | 3/2014 |
| CN | 105095895 A | 11/2015 |
| RU | 2 477 522 C2 | 3/2013 |

OTHER PUBLICATIONS

Tsang et al., Simpler Core Vector Machines with Enclosing Balls. Proceedings, 24$^{th}$ International Conference on Machine Learning. Jun. 20-24, 2007;911-18.

Zheng et al., A Simplified Minimum Enclosing Ball based Fast Incremental Support Vector Machine (SVM) Algorithm for Person Detection and Tracking. Proceedings of the 10$^{th}$ World Congress on Intelligent Control and Automation. Jul. 6-8, 2012;4936-41.

International Search Report for Application No. PCT/CN2016/077873 dated Jun. 28, 2016.

Chinese Office Action dated Nov. 17, 2017 in connection with Chinese Application No. 201510198411.0.

Wang, Self-learning method for banknote recognition based on self-correcting discriminant library. Electromechanical engineering technology, the Z2 issue. Aug. 8, 2016; 20-5.

Russian 1st Office Action dated Aug. 1, 2018 in connection with Application No. 2017135028/08(061326).

\* cited by examiner

SELF-CORRECTION RECOGNITION METHOD AND DEVICE FOR VALUABLE DOCUMENT RECOGNITION DEVICE

The application is the national phase of International Patent Application No. PCT/CN2016/077873, filed on Mar. 30, 2016, which claims priority to Chinese Patent Application No. 201510198411.0, titled "SELF-CORRECTION RECOGNITION METHOD FOR VALUABLE DOCUMENT RECOGNITION DEVICE", filed on Apr. 23, 2015 with the State Intellectual Property Office of the People's Republic of China, both of which applications are incorporated herein by reference in their entireties.

TECHNICAL FIELD

The present disclosure relates to the technology of valuable document recognition, and in particular to a self-correction recognition method and a self-correction recognition device for a valuable document recognition device.

BACKGROUND

For a sorter, an ATM, a VTM, a vending machine, an automatic ticket machine and other intelligent processing devices for currency or notes, a core module is a valuable document recognition module. The performance of recognizing a valuable document is a core index for evaluating a valuable document recognition device. The index is affected by the following two factors in the large-scale application.

1) A first effect is operating environment. Changes in temperature, humidity and other environmental changes affect a precision sensor signal, thus affecting recognition accuracy for valuable documents.

2) A second effect is difference between valuable documents. There are significant differences between valuable documents of various areas. For example, the bill quality in urban areas is generally good, while the bill quality in rural areas is poor. Thus a same set of recognition standards cannot be well adapted to both conditions.

In view of the above problems, the following solutions are applied in the industry currently.

1) A sufficient number of samples of valuable documents are provided, which normally is required to be one thousand or more samples per category. Five or more devices are selected to collect sample signals under conditions of variety of temperature and humidity changes. The purpose is to collect as many categories and sample signals as possible for training recognition software, thus making the recognition adaptable to variety of different environments.

2) Different recognition software is used based on sample differences in different regions. That is, different versions of recognition software are customized according to actual needs.

However, the existing method of valuable document recognition requires a lot of resources. Furthermore, when the use environment changes, a response scheme have to be re-developed, which cannot guarantee long-term stable effect, not only increases the service cost of a provider, but also affects the market benefits.

SUMMARY

A self-correction recognition method and a self-correction recognition method device for a valuable document recognition device is provided according to an embodiment of the present disclosure, which are used for solving the problem that the existing valuable document recognition method needs to consume a large amount of resources and a long-term stable use effect cannot be guaranteed due to the fact that a scheme needs to be renewed when a use environment changes.

A self-correction recognition method for a valuable document recognition device is provided according to an embodiment of the present disclosure, which includes:

extracting a feature M of the valuable document;

determining whether the feature M falls in a discriminant library of any preset category i, and obtaining a substitutive centroid $O'_i$ based on a feature centroid $O_i$ and the feature M in a case that the feature M falls in the discriminant library of the preset category i; and updating the discriminant library of the category i by replacing the feature centroid $O_i$ of the category i with the substitutive centroid $O'_i$;

wherein, the discriminant library is pre-constructed based on the feature centroid $O_i$ of the category i; and the feature centroid $O_i$ is calculated from a feature of the category i.

Optionally, before extracting the feature M of the valuable document, the method further includes:

extracting features of n categories of a valuable document, where each of the n categories includes one or more features, and n is greater than 1;

calculating the feature centroid $O_i$ of the category i based on the features of the category i;

obtaining a relative discriminant plane group of the category i based on the feature centroid $O_i$, wherein the relative discriminant plane group of the category i is composed of relative discriminant planes of the category i relative to the other n−1 categories, and a relative discriminant plane $l_{i\eta}$ of the category i relative to a category η satisfies that the relative discriminant plane $l_{i\eta}$ is perpendicular to a connection line between the feature centroid $O_i$ of the category i and a feature centroid $O_\eta$ of the category η, valuable documents of the category i and the category η are respectively divided to the two sides of the plane, all valuable documents of the category i are located on a positive side of the relative discriminant plane $l_{i\eta}$, all valuable documents of the category η are located on a negative side of the relative discriminant plane $l_{i\eta}$, and a minimum value of distances between valuable documents of the category i and the relative discriminant plane $l_{i\eta}$ is less than a minimum value of distances between valuable documents of the category η and the relative discriminant plane $l_{i\eta}$, and i is not equal to η;

building a discriminant sphere of the category i with a radius $R_i$, where $R_i$ is determined by the feature centroid $O_i$ and the relative discriminant plane group of the category i; and determining an intersecting area between the relative discriminant plane group of the category i and the discriminant sphere of the category i as a discriminant library of the category i.

Optionally, the relative discriminant plane is expressed as:

$$w_{i\eta}^T * X + d_{i\eta} = 0$$

where X is a space vector of the valuable document feature, $w_{i\eta}$ is a normal vector of the relative discriminant plane $l_{i\eta}$, and $d_{i\eta}$ is an intercept of the relative discriminant plane $l_{i\eta}$.

Optionally, the radius $R_i$ is expressed as:

$$R_i = \min\left(\varepsilon_i, \frac{\varepsilon_i + \chi_i}{2}\right),$$

where, $\varepsilon_i$ is a minimum value of distances between the feature centroid $O_i$ of the category i and the relative discriminant plane group of the category i, and $\chi_i$ is a maximum value of distances between the feature centroid $O_i$ of the category i and all the valuable documents of the category i.

Optionally, the substitutive centroid $O'_i$ is expressed as:

$$O'_i = (1-\gamma)O_i + \gamma M,$$

where, an update coefficient $\gamma$ is less than 1 and greater than 0.

Optionally, the calculating the feature centroid $O_i$ of the category i based on the features of the category i specifically includes:

obtaining the features of the category i; and
calculating an arithmetic mean of the features of the category i as the feature centroid $O_i$.

Optionally, $$\varepsilon_i = \min_{\eta \neq i}(\|O_i l_{i\eta}\|) = \min_{\eta \neq i}\left(\left|\frac{w_{i\eta}^T * O_i + d_{i\eta}}{\|w_{i\eta}\|}\right|\right),$$

$$\chi_i = \max_{1 \leq j \leq N_i}(\|O_i M_{ij}\|) = \max_{1 \leq j \leq N_i}\left(\sqrt{\left(\sum_{k=1}^{n}(o_{ik} - m_{ijk})^2\right)}\right).$$

Where, $N_i$ is the number of valuable documents for the category i, $O_{ik}$ is a $k^{th}$ feature value of the feature centroid $O_i$ of the category i, $M_{ij}$ is a $j^{th}$ feature in the category i, and n is the number of features of the valuable documents.

Optionally, the determining whether the feature M falls in a discriminant library of any preset category i specifically includes:

determining whether the feature M satisfies both of the following two expressions:

$$w_{i\eta}^T * M + d_{i\eta} > 0$$

$$\|\overrightarrow{MO_i}\| = \sqrt{\sum_{k=1}^{n}(m_k - o_{ik})^2} < R_i$$

Where, $\|\overrightarrow{MO_i}\|$ is a distance between the feature M and the feature centroid $O_i$.

Optionally, before updating the discriminant library of the category i by replacing the feature centroid $O_i$ of the category i with the substitutive centroid $O'_i$, the method further includes:

determining whether the substitutive centroid $O'_i$ satisfies a preset correction condition, and performing the step of updating the discriminant library of the category i by replacing the feature centroid $O_i$ of the category i with the substitutive centroid $O'_i$ in a case that the substitutive centroid $O'_i$ satisfies the preset correction condition, where in a case that the substitutive centroid $O'_i$ does not satisfy the preset correction condition, the discriminant library is not updated.

Optionally, the determining whether the substitutive centroid $O'_i$ satisfies a preset correction condition specifically includes:

determining whether a distance $S_{i\eta}$ between the substitutive centroid $O'_i$ and the relative discriminant plane $l_{i\eta}$ satisfies:

$$S_{i\eta} > R_i - \frac{\Delta_{i\eta}}{2}.$$

Where, $\Delta_{i\eta}$ is a distance between the relative discriminant plane $l_{i\eta}$ and a relative discriminant plane $l_{\eta i}$, and $l_{\eta i}$ is the relative discriminant plane of the category $\eta$ relative to the category i.

A self-correction recognition device for a valuable document recognition device is provided according to an embodiment of the present disclosure, including: a feature extracting unit, a first determining unit, a substitutive centroid obtaining unit and an updating unit.

The feature extraction unit is configured to extract a feature M of a valuable document.

The first determining unit is configured to determine whether the feature M falls in a discriminant library of any preset category i, and activate the substitutive centroid obtaining unit in a case that the feature M falls in the discriminant library of the preset category i.

The substitutive centroid obtaining unit is configured to obtain a substitutive centroid $O'_i$ based on a feature centroid $O_i$ and the feature M.

The updating unit is configured to update the discriminant library of the category i by replacing the feature centroid $O_i$ of the category i with the substitutive centroid $O'_i$.

The discriminant library is pre-constructed based on the feature centroid $O_i$ of the category i; and the feature centroid $O_i$ is calculated from a feature of the category i.

Preferably, the device further includes: a feature extracting subunit, a calculating unit, a plane obtaining unit, a dividing unit, a constructing unit and a determining unit.

The feature extracting subunit is configured to extract features of n categories of a valuable document, where each of the n categories includes one or more features, and n is greater than 1.

The calculating unit is configured to calculate the feature centroid $O_i$ of the category i based on the features of the category i.

The plane obtaining unit is configured to obtain a relative discriminant plane group of the category i based on the feature centroid $O_i$. Where the relative discriminant plane group of the category i is composed of relative discriminant planes of the category i relative to the other n−1 categories, and a relative discriminant plane $l_{i\eta}$ of the category i relative to a category $\eta$ satisfies that the relative discriminant plane $l_{i\eta}$ is perpendicular to a connection line between the feature centroid $O_i$ of the category i and a feature centroid $O_\eta$ of the category $\eta$.

The dividing unit is configured to divide valuable documents of the category i and the category $\eta$ to the two sides of the plane. And all valuable documents of the category i are located on a positive side of the relative discriminant plane $l_{i\eta}$, all valuable documents of the category $\eta$ are located on a negative side of the relative discriminant plane $l_{i\eta}$, and a minimum value of distances between valuable documents of the category i and the relative discriminant plane $l_{i\eta}$ is smaller than a minimum value of distances between valuable documents of the category $\eta$ and the relative discriminant plane $l_{i\eta}$, and i is not equal to $\eta$.

The constructing unit is configured to build a discriminant sphere of the category i with a radius $R_i$. Where $R_i$ is determined by the feature centroid $O_i$ and the relative discriminant plane group of the category i.

The determining unit is configured to determine an intersecting area between the relative discriminant plane group of the category i and the discriminant sphere of the category i as a discriminant library of the category i.

Preferably, the calculating unit includes: a feature obtaining unit and a calculating subunit.

The feature obtaining unit is configured to obtain the features of the category i.

The calculating subunit is configured to calculate an arithmetic mean of the features of the category i as the feature centroid $O_i$.

Preferably, the device further includes: a second determining unit, configured to determine whether the substitutive centroid $O'_i$ satisfies a preset correction condition, and activate the updating unit in a case that the substitutive centroid $O'_i$ satisfies the preset correction condition.

As can be seen from the above technical solution, embodiments of the present disclosure have the following advantages.

In the embodiments of the present disclosure, by establishing a discriminant library with self-correcting ability, when any valuable document enters the recognition device, a calculated substitutive centroid is used to realize self-correction. Therefore, for different environment changes and differences of valuable documents in different regions, better recognition results can be achieved. When the use environment changes, There is no need to re-develop a response scheme, thereby ensuring long-term stability of using effects and saving costs and resources.

DETAILED DESCRIPTION OF THE EMBODIMENTS

A self-correction recognition method and device for a valuable document recognition device is provided according to an embodiment of the present disclosure, which are used for solving the problem that the existing valuable document recognition method needs to consume a large amount of resources and a long-term stable use effect cannot be guaranteed due to the fact that a scheme needs to be renewed when a use environment changes.

The technical solution according to the embodiments of the present disclosure will be described clearly and completely as follows in conjunction with the accompany drawings in the embodiments of the present disclosure, so that purposes, characteristics and advantages of the present disclosure can be more obvious and understandable. It is obvious that the described embodiments are only a part of the embodiments according to the present disclosure. All the other embodiments obtained by those skilled in the art based on the embodiments in the present disclosure without any creative work belong to the scope of the present disclosure.

Figure 1:
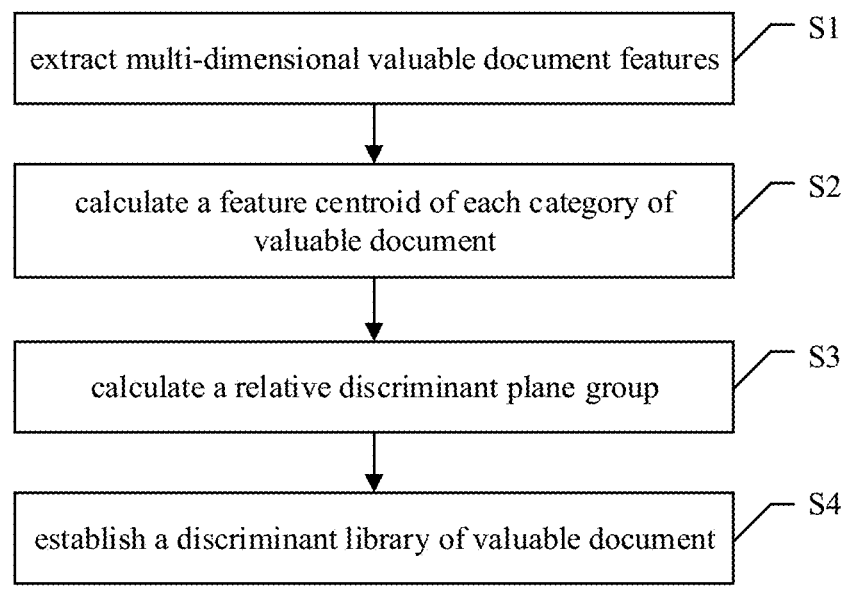
FIG. 1 is a flow chart for establishing a discriminant library of a valuable document according to an embodiment of the present disclosure.
Figure 2:
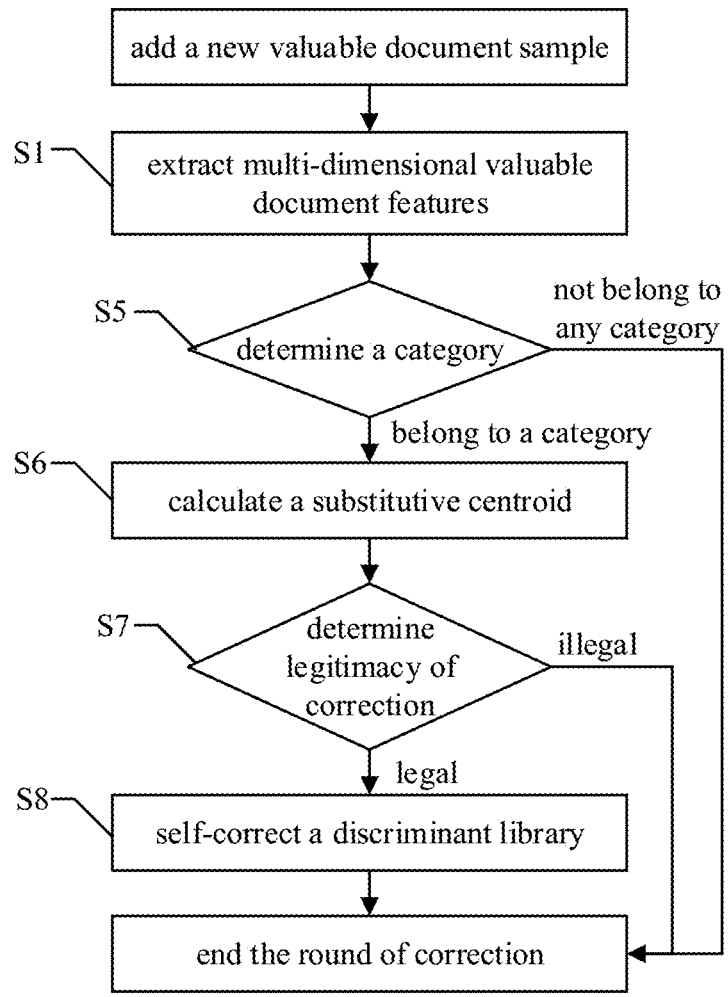
FIG. 2 is a flow chart for realizing self-correction of a discriminant library of a valuable document according to an embodiment of the present disclosure.
Figure 3:
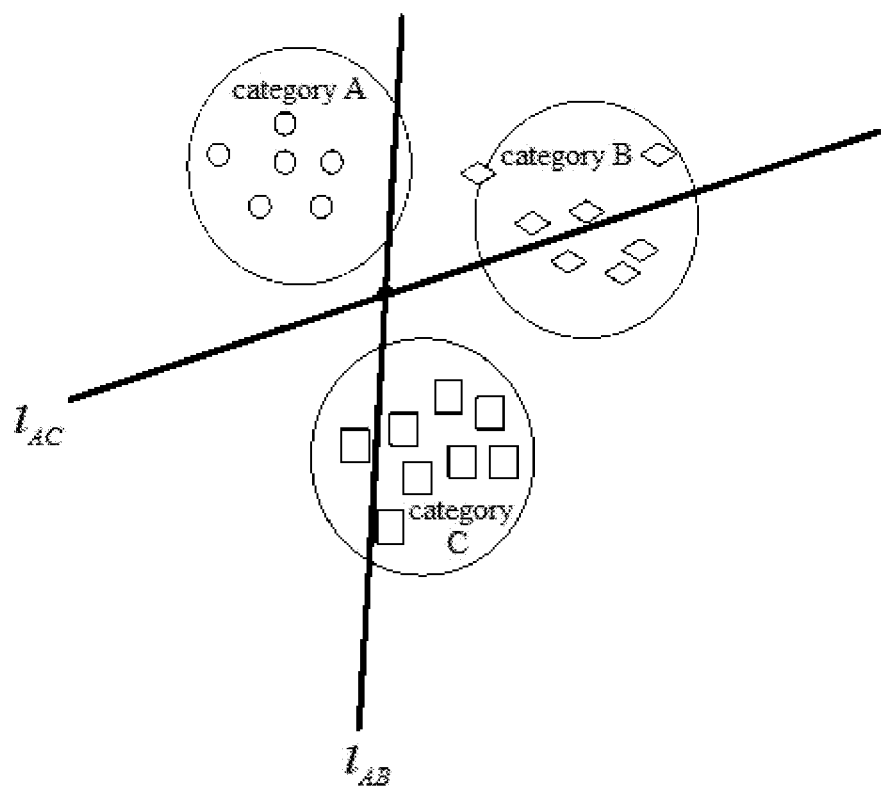
FIG. 3 is a schematic diagram of a relative discriminant plane group according to an embodiment of the present disclosure.

In the present scheme, a discriminant library of a valuable document is firstly established, and the construction process is shown in FIG. 1. Then, in the process of recognition, the discriminant library of a valuable document is self-corrected based on new valuable documents, to finally achieve desired effect. The correcting process is shown in FIG. 2.

Table 1 is a summary table of the mathematical symbol meaning according to the present disclosure.

| number | sign | meaning | remark |
| --- | --- | --- | --- |
| 1 | i, $\eta$ | category index of a valuable document, different mathematical symbols represent different categories | related to a valuable document |
| 2 | $N_i$ | a sample number of an $i^{th}$ category of valuable document | |
| 3 | $N_\eta$ | a sample number of a $\eta^{th}$ category of valuable document | |
| 4 | j | an index of a valuable document in an $i^{th}$ category of valuable document | |
| 5 | s | an index of a valuable document code in a $\eta^{th}$ category of valuable document | |
| 6 | n | the number of valuable document features, i.e., the number of dimension of feature, and in the embodiments n = 240 | |
| 7 | k | a feature value index for a valuable document | |
| 8 | X | variables of n-dimensional feature spaces | |
| 9 | M | a valuable document feature in a n-dimensional feature space | |
| 10 | $M_{ij}$ | a $j^{th}$ valuable document feature in an $i^{th}$ category | |
| 11 | $M_{\eta s}$ | a $s^{th}$ valuable document feature in a $\eta^{th}$ category | |
| 12 | $m_{ijk}$ | a $k^{th}$ feature value of a $j^{th}$ valuable document feature $M_{ij}$ in an $i^{th}$ category | |
| 13 | $O_i$ | a centroid of an $i^{th}$ category of valuable document | related to a discriminant sphere |
| 14 | $O_\eta$ | a centroid of a $\eta^{th}$ category of valuable document | |
| 15 | $O'_i$ | a substitutive centroid of an $i^{th}$ category of valuable document | |
| 16 | $o_{ik}$ | a $k^{th}$ feature value of a centroid $O_i$ of an $i^{th}$ category of valuable document | |
| 17 | $R_i$ | a discriminant radius centered on a centroid $O_i$ of an $i^{th}$ category of valuable document | |
| 18 | $R_\eta$ | a discriminant radius centered on a centroid $O_\eta$ of a $\eta^{th}$ category of valuable document | |

| number | sign | meaning | remark |
|---|---|---|---|
| 19 | $L_i$ | a relative discriminant plane group of an $i^{th}$ category of valuable document, which is composed of $l_{i\eta}$ | related to a relative discriminant plane |
| 20 | $l_{i\eta}$ | a relative discriminant plane of a cetegory i relative to a category $\eta$, wherein $\eta \neq i$ | |
| 21 | $w_{i\eta}$ | a normal vector of a relative discriminant plane $l_{i\eta}$ | |
| 22 | $d_{i\eta}$ | an intercept of a relative discriminant plane $l_{i\eta}$ | |
| 23 | $l_{\eta i}$ | a relative discriminant plane of a category $\eta$ relative to a category i, wherein $\eta \neq i$ | |
| 24 | $w_{\eta i}$ | a normal vector of a relative discriminant plane $l_{\eta i}$ | |
| 25 | $d_{\eta i}$ | an intercept of a relative discriminant plane $l_{\eta i}$ | |
| 26 | $a_{i\eta}$ | a minimum value of distances between all samples in an $i^{th}$ category and a relative discriminant plane $l_{i\eta}$ | related to a distance |
| 27 | $b_{i\eta}$ | a minimum value of distances between all samples in a $\eta^{th}$ category and a relative discriminant plane $l_{i\eta}$ | |
| 28 | $a_{\eta i}$ | a minimum value of distances between all samples in a $\eta^{th}$ category and a relative discriminant plane $l_{\eta i}$ | |
| 29 | $b_{\eta i}$ | a minimum value of distances between all samples in an $i^{th}$ category and a relative discriminant plane $l_{\eta i}$ | |
| 30 | $\varepsilon_i$ | a minimum value of distances between an $i^{th}$ category centroid and all relative discriminant planes of a category i | |
| 31 | $\chi_i$ | a maximum value of distances between an $i^{th}$ category centroid and all developing samples of a category i | |
| 32 | $S_{i\eta}$ | a distance between an $i^{th}$ category centroid and a relative discriminant plane $l_{i\eta}$ of a category i | |
| 33 | $S_{\eta i}$ | a distance between a $\eta^{th}$ category centroid and a relative discriminant plane $l_{\eta i}$ of a category $\eta$ | |
| 34 | $\Delta_{i\eta}$ | a distance between a relative discriminant plane $l_{\eta i}$ and a relative discriminant plane $l_{i\eta}$, $l_{\eta i}$ is parallel to $l_{i\eta}$, and directions of normal vector are opposite | |
| 35 | min | calculate a minimum value of two elements | calculation |
| 36 | $\min\limits_{1 \leq s \leq N_\eta}$ | for s being 1 to $N_\eta$, calculate a minimum value | and coefficient |
| 37 | $\min\limits_{1 \leq j \leq N_i}$ | for j being 1 to $N_i$, calculate a minimum value | |
| 38 | $\min\limits_{\eta \neq i}$ | for all $\eta$ but $\eta \neq i$, calculate a minimum value | |
| 39 | $\gamma$ | an updating coefficient of a valuable document centroid, generally $0.0001 < \gamma < 0.01$, in the embodiment $\gamma = 0.001$ | |
| 40 | p | a ratio of $b_{i\eta}$ to $a_{i\eta}$, generally $p \geq 1$ is required, in the embodiment p = 2 | |

First, it should be noted that in the embodiments of the present disclosure, a feature of the valuable document is a set of vector characterizing the valuable document, and developing samples of the valuable document are a number of valuable documents for constructing an initial discriminant library.

A process for establishing a discriminant library of the valuable document is specifically described as follows.

In step S1, multi-dimensional valuable document features are extracted. Feature extraction methods for valuable documents vary slightly depending on different application scenarios. Generally, extracted features of same categories of valuable documents are similar, and extracted features of different categories of valuable documents are significantly different. In the solution, the number of features of the valuable document is not strictly required, which is generally from dozens to hundreds. The combination of all the features of the valuable documents constitutes a super-high-dimensional feature space. The following two specific embodiments are provided for the method of extracting the valuable document, which however is not limited thereto.

A first specific embodiment is provided as step S1-1. Based on a color image signal of a valuable document, an image is divided into several equal parts. For example, the valuable document is divided into 80 equal parts (10*8), and after the division, average gray values of three color components of RGB are calculated as feature values, totaling 80*3=240 values, that is, a feature with 240 elements is obtained. Different banknotes have different features, and all valuable document features constitute a 240-dimensional feature space.

A second specific embodiment is provided as step S1-2. Different feature information of valuable document, such as ultraviolet optical feature information, infrared optical feature information, fluorescence feature information, magnetic feature information, white light image feature information, infrared image feature information, ultraviolet image feature information, magnetic image feature information, size feature information, and thickness signal feature information, is extracted. One or more features are extracted from signals of each of the above ten different types of information. For example, the size feature information may include a length feature and a width feature of a valuable document, a magnetic coding feature of a security line for a valuable document may be extracted from the magnetic feature information, a fluorescence response feature for a valuable document may be extracted from the fluorescence feature information. Generally, hundreds of features may be extracted from the ten types of information. It is acceptable to select more or less features, or to select only a few of the ten types of information, or to select a type of information other than the ten types of information, which are all included in the present disclosure.

The quality of the feature extraction will affect the recognition effect and the speed of self-correction, but the valuable document discriminant library can be self-corrected by following the self-correction method.

In step S2, a feature centroid of each category of valuable document is calculated. For any category i of valuable documents, a multi-dimensional valuable document feature is extracted in S1. A feature centroid is represented by $O_i$, and the feature centroid is shorted as a centroid. $O_i$ is equal to an arithmetic mean of all features of the valuable document. If $N_i$ represents a sample number of an $i^{th}$ category of valuable document, and $M_{ij}$ represents a $j^{th}$ valuable document feature in the i category, then $$O_i = \frac{1}{N_i} \sum_{j=0}^{N_i} M_{ij}.$$

In particular, $O_i$ and $M_{ij}$ are both one-dimensional vectors, and the number of elements is equal to a feature number of the valuable document. Obviously for any i and j, a dimension number of a feature vector $M_{ij}$ is the same as a dimension number of $O_i$, which is equal to the number of features extracted in S1 and is denoted as n. Then, $$O_i = (o_{i1}, o_{i2}, \ldots, o_{in})^T$$

$$M_{ij} = (m_{ij1}, m_{ij2}, \ldots, m_{ijn})^T.$$

In the solution, the number of categories of valuable documents, the number of features of valuable documents, and the number of developing samples of each valuable document category can be defined depending on different processed objects. The valuable document categories may include 16 categories, including:
1) a front-viewed normal orientation of RMB 100 yuan;
2) a front-viewed upside-down orientation of RMB 100 yuan;
3) a back-viewed normal orientation of RMB 100 yuan;
4) a back-viewed upside-down orientation of RMB 100 yuan;
5) a front-viewed normal orientation of RMB 50 yuan;
6) a front-viewed upside-down orientation of RMB 50 yuan;
7) a back-viewed normal orientation of RMB 50 yuan;
8) a back-viewed upside-down orientation of RMB 50 yuan;
9) a front-viewed normal orientation of RMB 20 yuan;
10) a front-viewed upside-down orientation of RMB 20 yuan;
11) a back-viewed normal orientation of RMB 20 yuan;
12) a back-viewed upside-down orientation of RMB 20 yuan;
13) a front-viewed normal orientation of RMB 10 yuan;
14) a front-viewed upside-down orientation of RMB 10 yuan;
15) a back-viewed normal orientation of RMB 10 yuan; and
16) a back-viewed upside-down orientation of RMB 10 yuan.

A first category of valuable document is a front-viewed normal orientation of RMB 100 yuan, and the number of features may be 240 features described in step S1-1 based on specific embodiment 1, that is n=240. The number of developing samples for each category may be different, and the number of developing samples of the first category of valuable document, which is a front-viewed normal orientation of RMB 100 yuan, may be 50. A centroid of the first category of a front-viewed normal orientation of RMB 100 yuan is:

$$O_1 = \frac{1}{50} \sum_{j=0}^{50} M_{1j}.$$

Through the above method, feature centroid of all categories may be obtained.

In step S3, a relative discriminant plane group is calculated. Relative discriminant plane groups of all categories of valuable documents are calculated, the number of categories may be 16 as examples of step S2, and it may also be other number of categories. For any category i of valuable document, a relative discriminant plane group $L_i$ is composed of planes defined as follows.

In step S3-1, for any category $\eta \neq i$, a relative discriminant plane of a category i relative to a category $\eta$ is defined as $l_{i\eta}$. $L_i$ is composed of relative discriminant planes of the category i relative to all other categories, that is, $$L_i = \sum_{\eta \neq i} l_{i\eta}.$$

For the 16 categories of valuable documents in the example of step S2, each category has 15 relative discriminant planes, which together form a relative discriminant plane group of the category, so there are 16 relative discriminant plane groups.

In step S3-2, for any $\eta \neq i$, based on the centroid defined in step S2, the relative discriminant plane $l_{i\eta}$ defined in step S3-1 needs to satisfy that $l_{i\eta}$ is perpendicular to a connection line between a centroid $O_i$ of the category i and a centroid $O_\eta$ of a category $\eta$, and thus normal vector of $l_{i\eta}$ is parallel to the connection line between $O_i$ and $O_\eta$. The method also defines the normal vector of $l_{i\eta}$ is from $O_\eta$ to $O_i$, and the normal vector of $l_{i\eta}$ is denoted as $w_{i\eta}$, then, $$w_{i\eta} = O_i - O_\eta = (o_{i1} - o_{\eta 1}, o_{i2} - o_{\eta 2}, \ldots, o_{in} - o_{\eta n})^T$$

In step S3-3, the relative discriminant plane $l_{i\eta}$ defined in step S3-1 also needs to satisfy that the category i and the category $\eta$ are completely divided by $l_{i\eta}$ to the two sides of the plane. According to step S3-2, the normal vector of $l_{i\eta}$ is defined from $O_\eta$ to $O_i$, which actually requires that all sample features of the category i is on the positive side of $l_{i\eta}$, and all sample features of the category $\eta$ is on the negative side of $l_{i\eta}$, which is equivalent to that values obtained by respectively substituting all the sample features of the category i into an equation of the relative discriminant plane $l_{i\eta}$ are greater than 0, and values obtained by respectively substituting all the sample features of the category $\eta$ into an equation of the relative discriminant plane $l_{i\eta}$ are less than 0.

If there is no relative discriminant plane satisfying the condition S3-3, it is indicated that the category i and the category $\eta$ are not completely separated to each other in the feature space, which is rare, and it is necessary to adjust the feature extraction method to be adapted to the model.

In step S3-4, based on the relative discriminant plane $l_{i\eta}$ defined by the above S3-1, S3-2, S3-3, a minimum value of distances between all samples in the category i and the plane $l_{i\eta}$ is denoted as $a_{i\eta}$, and a minimum value of distances between all samples in the category η and the plane $l_{i\eta}$ is denoted as $b_{i\eta}$. In the solution, and $b_{i\eta}$ need to meet the following condition:

$$b_{i\eta} = p * a_{i\eta}.$$

Where, p is a constant and not less than 1, generally p is selected in the range of 1 to 100. In fact, when p=1, $l_{i\eta}$ is located between the category i and the category η, the restriction is relatively relaxed. When p≥10, the restrictions is relatively strict. When features of different categories are highly distinct, a larger p may be selected. Generally p=2, and for η≠i, it is satisfied that:

$$b_{i\eta} = 2 * a_{i\eta}.$$

It is to be noted that at least the condition $b_{i\eta} \geq a_{i\eta}$ needs to be satisfied in the present embodiment. As shown in FIG. 5, the category i and the category η can be separated by either $l_{i\eta}$ or $l_{i\eta}$. But only when $b_{i\eta} \geq a_{i\eta}$, $l_{i\eta}$ is more close to the category i, $l_{i\eta}$ is more close to the category η, so that the two discriminant planes will not be overlapped, thereby ensuring uniqueness of discrimination. On this basis, the relationship is described more scientifically with $b_{i\eta} = p * a_{i\eta}$, while having better effect in fact if $b_{i\eta} = 2 * a_{i\eta}$. If $b_{i\eta} = a_{i\eta}$, $l_{i\eta}$ and $l_{i\eta}$ are overlapped, i.e., $l_{i\eta}$ and $l_{i\eta}$ are same planes, the degree of discrimination is poor. When p is too large, the restriction is harsh, and the training is difficult to converge.

In step S3-5, based on the above steps S3-1, S3-2, S3-3 and S3-4, the relative discriminant plane $l_{i\eta}$ may be obtained. The number of features is n, in n-dimensional space $X = (x_1, x_2, \ldots, x_n)^T$, an expression of the relative discriminant plane $l_{i\eta}$ may be defined as:

$$R_i = \min\left(\varepsilon_i, \frac{\varepsilon_i + \chi_i}{2}\right),$$

Based on step S3-2, a normal line $w_{i\eta}$ of the relative discriminant plane $l_{i\eta}$ is obtained as follows:

$$w_{i\eta} = O_i - O_\eta = (o_{i1} - o_{\eta 1}, o_{i2} - o_{\eta 2}, \ldots, o_{in} - o_{\eta n})^T$$

An intercept $d_{i\eta}$ of the relative discriminant plane $l_{i\eta}$ is solved. According to step S3-4, $b_{i\eta} = p * a_{i\eta}$ stands. According to step S3-4, for $a_{i\eta}$, $b_{i\eta}$, as well as the relative discriminant plane $l_{i\eta}$ defined above, a relationship is provided as follows:

$$\min_{1 \leq s \leq N_\eta} \left(\left|\frac{w_{i\eta}^T * M_{\eta s} + d_{i\eta}}{\|w_{i\eta}\|}\right|\right) = p * \min_{1 \leq j \leq N_i} \left(\left|\frac{w_{i\eta}^T * M_{ij} + d_{i\eta}}{\|w_{i\eta}\|}\right|\right).$$

Where, $$\min_{1 \leq s \leq N_\eta}$$

represents calculating a minimum value of a function of s valuing from 1 to $N_\eta$, and $$\min_{1 \leq j \leq N_i}$$

represents calculating a minimum value of a function of j valuing from 1 to $N_i$. According to step S3-3, the values obtained by substituting all the sample features of the category i into an equation of the relative discriminant plane $l_{i\eta}$ are greater than 0, and the values obtained by substituting all the sample features of the category η into the equation of the relative discriminant plane $l_{i\eta}$ are less than 0, which is expressed as:

$$w_{i\eta}^T * M_{\eta s} + d_{i\eta} < 0$$
$$w_{i\eta}^T * M_{ij} + d_{i\eta} > 0.$$

Then, $$\min_{1 \leq s \leq N_\eta} (-w_{i\eta}^T * M_{\eta s} - d_{i\eta}) = p * \min_{1 \leq j \leq N_i} (w_{i\eta}^T * M_{ij} + d_{i\eta}).$$

Thereby, $$d_{i\eta} = \frac{1}{p+1} * \left(\min_{1 \leq s \leq N_\eta} (-w_{i\eta}^T * M_{\eta s}) - p * \min_{1 \leq j \leq N_i} (w_{i\eta}^T * M_{ij})\right).$$

In summary, a normal and an intercept of the relative discriminant plane $l_{i\eta}$ are obtained, that is, an expression of the relative discriminant plane $l_{i\eta}$ is obtained. In a same way, the relative discriminant plane groups of all categories can be obtained.

In step S3-6, although based on the above steps, the relative discriminant plane group of all categories can be obtained, the symmetry derivation relation of the relative discriminant plane is also provided.

A normal of the relative discriminant plane $l_{\eta i}$ it of the category η relative to the category i is defined as follows:

$$w_{\eta i} = O_\eta - O_i = -w_{i\eta}.$$

Figure 4:
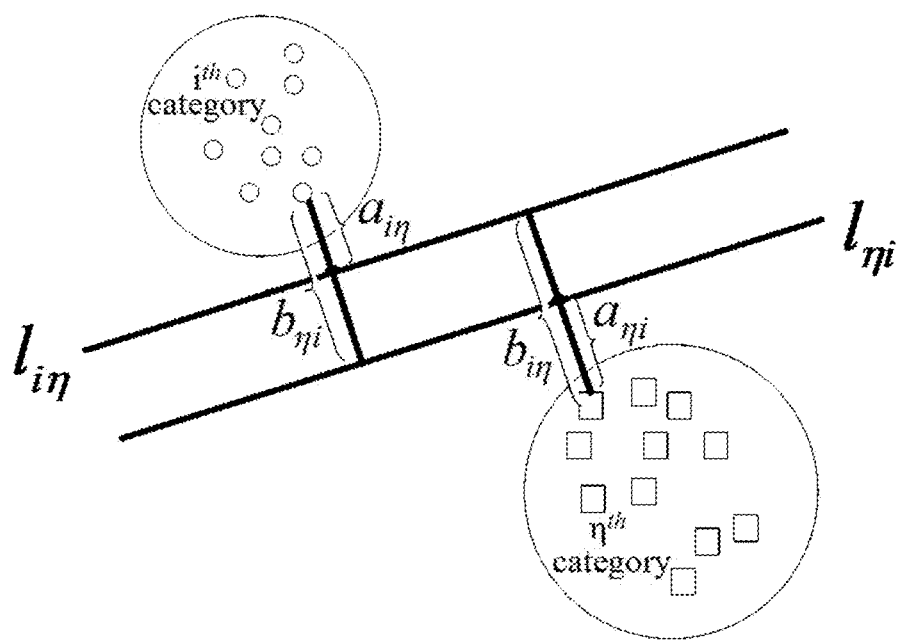
FIG. 4 is a schematic diagram of symmetry of relative discriminant planes according to an embodiment of the present disclosure.

Therefore, $w_{\eta i}$ is parallel to $w_{i\eta}$, and thus the relative discriminant plane $l_{\eta i}$ is parallel to the relative discriminant plane $l_{i\eta}$. As shown in FIG. 4, a sample having the minimum value of distances between all samples of the category i and the relative discriminant plane $l_{i\eta}$ is the same as a sample having the minimum value of distances between all samples of the category i and the relative discriminant plane $l_{\eta i}$. Similarly, a sample having the minimum value of distances between all samples of the category η and the relative discriminant plane $l_{i\eta}$ is the same as a sample having the minimum value of distances between all samples of the category η and the relative discriminant plane $l_{\eta i}$. So there is:

$$a_{i\eta} + b_{i\eta} = a_{\eta i} + b_{\eta i}.$$

Due to p>1, it is obtained that $b_{i\eta} \geq a_{i\eta}$ and $b_{\eta i} \geq a_{\eta i}$, then $l_{i\eta}$ is closer to $O_i$ than $l_{\eta i}$, and $l_{\eta i}$ is closer to $O_\eta$ than $l_{i\eta}$. A distance between $l_{\eta i}$ and $l_{i\eta}$ is denoted as $\Delta_{i\eta}$, which satisfies:

$$\Delta_{i\eta} = b_{i\eta} + b_{\eta i} - a_{i\eta} - a_{\eta i} = (p-1)(a_{i\eta} + a_{\eta i}).$$

It should be noted that, when a spatial dimension is n=2, the relative discriminant plane $l_{i\eta}$ is degenerated into a straight line of a plane space. As shown in FIG. 4, the spatial dimension is n=2 (in general, n>10), the relative discriminant planes $l_{i\eta}$ and $l_{\eta i}$ are both degenerated into straight lines of the plane space. When n=3, the relative discriminant plane $l_{i\eta}$ is degenerated into a plane of a normal three-dimensional space. When n=4, the relative discriminant plane $l_{i\eta}$ is a three-dimensional space. In step S1-1, when n=240, $l_{i\eta}$ is a 239-dimensional hyper-plane.

In step S4, a valuable document discriminant library is established. The valuable document discriminant library is composed of discriminant domains of all the valuable document categories. A discriminant domain of a category is described as follows. For example, for the category i, whether a feature M of a n-dimension space belongs to the category i is determined by the following steps.

In step S4-1, for the category i, the discriminant radius $R_i$ of the category is calculated by the method as follows. First, based on step S2, a minimum value e of distances between the centroid $O_i$ of category i and all relative discriminant planes of the category i is calculated, and a maximum value $\chi_i$ of distances between $O_i$ and all developing samples of a category i is calculated, that is:

$$\varepsilon_i = \min_{\eta \neq i}(\|O_i l_{i\eta}\|) = \min_{\eta \neq i}\left(\left|\frac{w_{i\eta}^T * O_i + d_{i\eta}}{\|w_{i\eta}\|}\right|\right),$$

$$\chi_i = \max_{1 \leq j \leq N_i}(\|O_i M_{ij}\|) = \max_{1 \leq j \leq N_i}\left(\sqrt{\left(\sum_{k=1}^{n}(o_{ik} - m_{ijk})^2\right)}\right).$$

Where, $l_{i\eta}$ is the relative discriminant plane of the category i relative to the category $\eta$ defined in step S3, $N_i$ is the number of samples of valuable documents of the category i, $M_{ij}$ represents a $j^{th}$ valuable document feature in the category i, and n is the number of features. Then the calculation method for $R_i$ is defined as follows:

$$R_i = \min\left(\varepsilon_i, \frac{\varepsilon_i + \chi_i}{2}\right).$$

The expression of the radius $R_i$ provided in the embodiment takes into account both a relationship between a centroid and a relative discriminant plane, and a relationship between a centroid and a sample. This can ensure that a category is distinguishable from other categories and control the radius of the category (that is, separability between the category and abnormal data is ensured as far as possible).

In step S4-2, a discriminant sphere is constructed for each category i of valuable document with the feature centroid $O_i$ defined in step S2 as a center and a discriminant radius $R_i$ defined in step S4-1 as a radius. If the feature M is in the discriminant sphere, it means that M satisfies the definition of S4-2, and M may belong to the category i. If the feature M is outside the discriminant sphere, M is not belong to the category i. That is, the distance between M and $O_i$ is required to be less than $R_i$, which is expressed as follows:

$$\|\overrightarrow{MO_i}\| = \sqrt{\sum_{k=1}^{n}(m_k - o_{ik})^2} < R_i.$$

In step S4-3, it is also required that the result obtained by substituting the feature M into any relative discriminant planes of the relative discriminant plane group $L_i$ in the category i defined by step S3, must be positive, otherwise M does not belong to the category i, that is, for $\eta \neq i$, it is satisfied that:

$$w_{i\eta}^T * M + d_{i\eta} > 0.$$

A region where a discriminant sphere of a category defined in step S4-2 intersects a relative discriminant plane group of the category defined in step S3 is a discriminant domain of the category. If a feature of a valuable document is in the discriminant domain of the category, the valuable document belongs to the category, otherwise, the valuable document does not belong to the category.

A specific self-correction process of a valuable document discriminant library is further provided, which is described as follows.

In step S1, in an actual operating process of a valuable document recognition device, for a newly added valuable document sample, a valuable document signal is collected, and a multi-dimensional valuable document feature is extracted, referring to the above step S1.

In step S5, the category of the feature is determined. For the newly added valuable document sample, a valuable document feature M is extracted in step S1, and the category to which the valuable document feature belongs is determined based on the valuable document discriminant library defined in the above step S4. That is, according to S4, for any input feature M, if M meets both of the following two formulas:

$$w_{i\eta}^T * M + d_{i\eta} > 0$$

$$\|\overrightarrow{MO_i}\| = \sqrt{\sum_{\tau=1}^{n}(m_\tau - o_{i\tau})^2} < R_i,$$

it is determined that M belongs to the category i, otherwise, M does not belong to the category i.

In step S6, a substitutive centroid is calculated. For any newly inputted valuable document feature M, if it is determined that M belongs to the category i of valuable document in step S5, a substitutive centroid $O'_i$ of the category i of valuable document is calculated. A calculation formula of the substitutive centroid is provided as follows:

$$O'_i=(1-\gamma)O_i+\gamma M=((1-\gamma)o_1+\gamma m_1,(1-\gamma)o_2+\gamma m_2, \ldots ,(1-\gamma)o_n+\gamma m_n)^T.$$

Where, $\gamma$ is a update coefficient, and $0<\gamma<1$. If the update coefficient is larger, the update rate is faster, and if the update coefficient is smaller, the stability is better. Generally, $0.0001<\gamma<0.01$. Commonly, in the present embodiment, $\gamma$ may be selected as $$\gamma=0.001.$$

In step S7, legitimacy of correction is determined. That is, it is determined that whether a preset condition is met. A preset condition in the method may be the following correction rules. Based on the substitutive centroid $O'_i$ of the category i calculated in step S6, for $\eta \neq i$, a distance $S_{i\eta}$ between $O'_i$ and the relative discriminant plane $l_{i\eta}$ of the category i relative to the category $\eta$ is calculated, to determine whether it satisfies:

$$S_{i\eta} > R_i - \frac{\Delta_{i\eta}}{2}$$

where, $R_i$ is a discriminant radius of the category i of valuable document defined in step S4-1, and $\Delta_{i\eta}$ is a distance between the relative discriminant plane $l_{i\eta}$ and the relative discriminant plane $l_{\eta i}$ defined in step S3-6.

For all categories η≠i other than the category i, if the substitutive centroid O′$_i$ defined in step S6 can meet the condition:

$$S_{i\eta} > R_i - \frac{\Delta_{i\eta}}{2}, O'_i$$

meets the condition of legitimacy of correction, otherwise, O′$_i$ does not meet the condition of legitimacy of correction. It is to be understood that the condition of the legitimacy of correction ensures that a valuable document can only belong to one category, and will not belong to two different categories, that is, any two different categories do not overlap. Specific conditions may be preset by coordinating distances between each centroid and relative discriminant planes.

Further, the present method can ensure stability during the model correction process while ensuring the legality. That is, under the principle of legality of correction, any valuable document only belongs to at most one category, and cannot belong to two different categories during the correction process.

The course of proof is described as follows.

In order to prove that for any η≠i, a valuable document M cannot belong to both the category i and the category η, it only needs to prove that the valuable document M cannot be in both the discriminant sphere of the category i and the discriminant sphere of the category η. It is equivalent to prove that the two discriminant spheres do not intersect each other, that is, a distance between the centers of the two discriminant spheres is not less than a sum of radiuses of the two discriminant spheres, which is expressed as:

$$\|\overrightarrow{O_iO_\eta}\| \geq R_i + R_\eta.$$

The above equation is proved as follows.

Based on step S3-3, $O_i$ is on a positive side of $l_{i\eta}$, $O_\eta$ is in a negative side of $l_{i\eta}$, so a distance between $O_i$ and $O_\eta$ is not less than a sum of a distance between $O_i$ and $l_{i\eta}$, and a distance between $O_\eta$ and $l_{i\eta}$. As shown in FIG. 4, the distance between $O_\eta$ and $l_{i\eta}$ is equal to a distance between $O_\eta$ and $l_{\eta i}$ plus a distance between $l_{i\eta}$ and $l_{\eta i}$, so:

$$\|\overrightarrow{O_iO_\eta}\| \geq S_{i\eta} + S_{\eta i} + \Delta_{i\eta}.$$

Based on S7, it is provided:

$$S_{i\eta} > R_i - \frac{\Delta_{i\eta}}{2}$$

$$S_{\eta i} > R_\eta - \frac{\Delta_{i\eta}}{2},$$

Then, $$\|\overrightarrow{O_iO_\eta}\| \geq S_{i\eta} + S_{\eta i} + \Delta_{i\eta} > \left(R_i - \frac{\Delta_{i\eta}}{2}\right) + \left(R_\eta - \frac{\Delta_{i\eta}}{2}\right) + \Delta_{i\eta} = R_i + R_\eta.$$

Therefore, the two discriminant spheres of the category i and the category η do not intersect each other, that is, a valuable document can only belong to one category.

In step S8, the discriminant library is self-corrected. When a substitutive centroid calculated based on step S6 satisfies the condition of legitimacy of correction defined by S7, the discriminant library is self-corrected with the correction method of directly replacing $O_i$ with $O'_i$, that is $$O_i = O'_i.$$

With steps of S1, S5, S6, S7, and S8, the self-correction of valuable document discriminant library is realized on the basis of the valuable document discriminant library established in step S4, and it is proved based on step 7, that the self-correction process according to the present embodiment is stable.

Based on the above steps, self-correction of the valuable document discriminant library can be realized. According to the present disclosure, through the self-correcting of discriminant library, a good recognition effect can be achieved for different environmental changes and the difference between valuable documents in different regions. At the same time, the relative discriminant plane group is introduced in the present disclosure for supervising the self-correction process to avoid misrecognition of the valuable documents due to over-correction. Therefore, the whole self-correction process is supervised and stable.

The method according to present disclosure may not have a self-correcting termination condition for the above self-correction process of the discriminant library. As an extension and refinement of the application, it is possible to define a self-correcting condition as required in practices, that is, when a certain recognition effect is achieved, the self-correction may be stopped.

Based on the above self-correction recognition method for a valuable document recognition device, a self-correction recognition device for a valuable document recognition device is provided according to an embodiment of the present disclosure.

The self-correction recognition device for a valuable document recognition device provided according to the embodiment of the present disclosure includes: a feature extracting unit, a first determining unit, a substitutive centroid obtaining unit and an updating unit.

The feature extraction unit is configured to extract a feature M of a valuable document.

The first determining unit is configured to determine whether the feature M falls in a discriminant library of any preset category i, and activate the substitutive centroid obtaining unit in a case that the feature M falls in the discriminant library of the preset category i.

The substitutive centroid obtaining unit is configured to obtain a substitutive centroid O′$_i$ based on a feature centroid $O_i$ and the feature M.

The updating unit is configured to update the discriminant library of the category i by replacing the feature centroid $O_i$ of the category i with the substitutive centroid O′$_i$.

The discriminant library is pre-constructed based on the feature centroid $O_i$ of the category i; and the feature centroid $O_i$ is calculated from a feature of the category i.

In the embodiment of the present disclosure, by establishing a discriminant library with self-correcting ability, when any valuable document enters the recognition device, a calculated substitutive centroid is used to realize self-correction, and thus a good recognition results can be achieved for different environment changes and differences between valuable documents in different regions. When the use environment changes, there is no need to re-develop a response scheme, thereby ensuring long-term stability and saving costs and resources.

In another preferable embodiment, the device further includes: a feature extracting subunit, a calculating unit, a plane obtaining unit, a dividing unit, a constructing unit and a determining unit.

The feature extracting subunit is configured to extract features of n categories of a valuable document, where each of the n categories includes one or more features, and n is greater than 1.

The calculating unit is configured to calculate the feature centroid $O_i$ of the category i based on the features of the category i.

The plane obtaining unit is configured to obtain a relative discriminant plane group of the category i based on the feature centroid $O_i$. The relative discriminant plane group of the category i is composed of relative discriminant planes of the category i relative to the other n−1 categories, and a relative discriminant plane $l_{i\eta}$ of the category i relative to a category η satisfies that the relative discriminant plane $l_{i\eta}$ is perpendicular to a connection line between the feature centroid $O_i$ of the category i and a feature centroid $O_\eta$ of the category η.

The dividing unit is configured to divide valuable documents of the category i and the category η respectively to the two sides of the plane. All valuable documents of the category i are located on a positive side of the relative discriminant plane $l_{i\eta}$, all valuable documents of the category η are located on a negative side of the relative discriminant plane $l_{i\eta}$, and a minimum value of distances between valuable documents of the category i and the relative discriminant plane $l_{i\eta}$ is smaller than a minimum value of distances between valuable documents of the category η and the relative discriminant plane $l_{i\eta}$, and i is not equal to η.

The constructing unit is configured to build a discriminant sphere of the category i with a radius $R_i$, where $R_i$ is determined by the feature centroid $O_i$ and the relative discriminant plane group of the category i.

The determining unit is configured to determine an intersecting area between the relative discriminant plane group of the category i and the discriminant sphere of the category i as a discriminant library of the category i.

In one of possible implementations, the calculating unit may include: a feature obtaining unit and a calculating subunit.

The feature obtaining unit is configured to obtain the features of the category i.

The calculating subunit is configured to calculate an arithmetic mean of the features of the category i as the feature centroid $O_i$.

In another embodiment, the device further includes: a second determining unit, configured to determine whether the substitutive centroid $O'_i$ satisfies a preset correction condition, and activate the updating unit in a case that the substitutive centroid $O'_i$ satisfies the preset correction condition.

It is to be known clearly by those skilled in the art that, for convenient and clear description, for specific operation processes of the above system, device and unit, reference may be made to the corresponding process in the above method embodiment, which is not described here.

It should be noted that, the embodiments of the present disclosure are described herein in a progressive manner, with an emphasis placed on explaining the difference between each embodiment and the other embodiments; hence, for the same or similar parts among the embodiments, they can be referred to from one another. For the modulator disclosed in the embodiments, the corresponding descriptions are relatively simple because the modulator corresponds to the methods disclosed in the embodiments. The relevant portions may be referred to the description for the method parts. The above device embodiment is only illustrative. The unit described as a separate component may be or may not be separate physically, and the component which is displayed as a unit may be or may not be a physical unit, that is, may be located at a position, or may be distributed over multiple network units. Some or all of the units may be selected as required to implement the solution of the embodiment. Those skilled in the art will understand and practice without any creative work.

As described above, the above embodiments are only intended to describe the technical solutions of the disclosure, but not to limit the scope of the disclosure. Although the disclosure is described in detail with reference to the above embodiments, it should be understood by those ordinal skilled in the art that modifications can be made to the technical solutions recorded in the above embodiments or equivalent replacements can be made to some or all of the technical features thereof, which modifications and equivalent replacements will not make the corresponding technical solutions deviate from the scope of the technical solutions of the embodiments of the disclosure.

The invention claimed is:

1. A self-correction recognition method for a valuable document recognition device in an intelligent processing device for valuable documents, comprising:
   extracting a feature M of a valuable document entering in the valuable document recognition device;
   determining whether the feature M falls in a discriminant library of a category i,
   obtaining a substitutive centroid $O'_i$ based on a feature centroid $O_i$ and the feature M and determining the valuable document as in the category i, in a case that the feature M falls in the discriminant library of the category i; and
   updating the discriminant library of the category i by replacing the feature centroid $O_i$ of the category i with the substitutive centroid $O'_i$, wherein,
   the discriminant library is pre-constructed based on the feature centroid $O_i$ of the category i; and
   the feature centroid $O_i$ is calculated from a feature of the category i; and
   the substitutive centroid $O'_i$ is expressed as:

$$O'_i = (1-\gamma)O_i + \gamma M,$$

where an update coefficient γ is less than 1 and greater than 0.

2. The method according to claim 1, wherein before extracting the feature M of the valuable document, the method further comprises:
   extracting features of n categories of a valuable document, wherein each of the n categories comprises one or more features, and n is greater than 1;
   calculating the feature centroid $O_i$ of the category i based on the features of the category i;
   obtaining a relative discriminant plane group of the category i based on the feature centroid $O_i$, wherein the relative discriminant plane group of the category i is composed of relative discriminant planes of the category i relative to the other n−1 categories, and a relative discriminant plane $l_{i\eta}$ of the category i relative to a category η satisfies that the relative discriminant plane $l_{i\eta}$ is perpendicular to a connection line between the feature centroid $O_i$ of the category i and a feature centroid $O_\eta$ of the category η, valuable documents of the category i and the category η are respectively divided to the two sides of the plane, all valuable documents of the category i are located on a positive side of the relative discriminant plane $l_{i\eta}$, all valuable documents of the category η are located on a negative side of the relative discriminant plane $l_{i\eta}$, and a minimum value of distances between valuable documents of the category i and the relative discriminant plane $l_{i\eta}$ is smaller than a minimum value of distances between valuable documents of the category η and the relative discriminant plane $l_{i\eta}$, and i is not equal to η;

building a discriminant sphere of the category i with a radius $R_i$, wherein $R_i$ is determined by the feature centroid $O_i$ and the relative discriminant plane group of the category i; and determining an intersecting area between the relative discriminant plane group of the category i and the discriminant sphere of the category i as a discriminant library of the category i.

3. The method according to claim 2, wherein the relative discriminant plane is expressed as:

$$w_{i\eta}^T * X + d_{i\eta} = 0,$$

where X is a space vector of the valuable document feature, $w_{i\eta}$ is a normal vector of the relative discriminant plane $l_{i\eta}$, and $d_{i\eta}$ is an intercept of the relative discriminant plane $l_{i\eta}$.

4. The method according to claim 3, wherein the radius $R_i$, is expressed as:

$$R_i = \min\left(\varepsilon_i, \frac{\varepsilon_i + \chi_i}{2}\right),$$

where $\varepsilon_i$ is a minimum value of distances between the feature centroid $O_i$ of the category i and the relative discriminant plane group of the category i, and $\chi_i$ is a maximum value of distances between the feature centroid $O_i$ of the category i and all the valuable documents of the category i.

5. The method according to claim 2, wherein the calculating the feature centroid $O_i$ of the category i based on the features of the category i comprises:

obtaining the features of the category i; and calculating an arithmetic mean of the features of the category i as the feature centroid $O_i$.

6. The method according to claim 4, wherein, $$\varepsilon_i = \min_{\eta \neq i}(\|O_i l_{i\eta}\|) = \min_{\eta \neq i}\left(\left|\frac{w_{i\eta}^T * O_i + d_{i\eta}}{\|w_{i\eta}\|}\right|\right),$$

$$\chi_i = \max_{1 \leq j \leq N_i}(\|O_i M_{ij}\|) = \max_{1 \leq j \leq N_i}\left(\sqrt{\left(\sum_{k=1}^{n}(o_{ik} - m_{ijk})^2\right)}\right),$$

where $N_i$ is the number of valuable documents for the category i, $O_{ik}$ is a $k^{th}$ feature value of the feature centroid $O_i$ of the category i, $M_{ij}$ is a $j^{th}$ feature in the category i, and n is the number of features of the valuable documents.

7. The method according to claim 6, wherein the determining whether the feature M falls in a discriminant library of a category i comprises:

determining whether the feature M satisfies both of the following two expressions:

$$w_{i\eta}^T * M + d_{i\eta} > 0$$

$$\|\overrightarrow{MO_i}\| = \sqrt{\sum_{k=1}^{n}(m_k - o_{ik})^2} < R_i$$

where $\|\overrightarrow{MO_i}\|$ is a distance between the feature M and the feature centroid $O_i$.

8. The method according to claim 1, wherein before updating the discriminant library of the category i by replacing the feature centroid $O_i$ of the category i with the substitutive centroid $O'_i$, the method further comprises:

determining whether the substitutive centroid $O'_i$ satisfies a preset correction condition, and performing the step of updating the discriminant library of the category i by replacing the feature centroid $O_i$ of the category i with the substitutive centroid $O'_i$ in a case that the substitutive centroid $O'_i$ satisfies the preset correction condition, wherein in a case that the substitutive centroid $O'_i$ does not satisfy the preset correction condition, the discriminant library is not updated.

9. The method according to claim 8, wherein the determining whether the substitutive centroid $O'_i$ satisfies a preset correction condition comprises:

determining whether a distance $S_{i\eta}$ between the substitutive centroid $O'_i$ and the relative discriminant plane $l_{i\eta}$ satisfies:

$$S_{i\eta} > R_i - \frac{\Delta_{i\eta}}{2}$$

where $\Delta_{i\eta}$ is a distance between the relative discriminant plane $l_{i\eta}$ and a relative discriminant plane $l_{\eta i}$, and $l_{\eta i}$ is the relative discriminant plane of the category η relative to the category i.

10. A self-correction recognition device for a valuable document recognition device in an intelligent processing device for valuable documents, comprising: a feature extracting unit, a first determining unit, a substitutive centroid obtaining unit and an updating unit, wherein the feature extraction unit is configured to extract a feature M of a valuable document entering in the valuable document recognition device;

the first determining unit is configured to determine whether the feature M falls in a discriminant library of a category i, and activate the substitutive centroid obtaining unit and determine the valuable document as in the category i in a case that the feature M falls in the discriminant library of the category i;

the substitutive centroid obtaining unit is configured to obtain a substitutive centroid $O'_i$ based on a feature centroid $O_i$ and the feature M;

the updating unit is configured to update the discriminant library of the category i by replacing the feature centroid $O_i$ of the category i with the substitutive centroid $O'_i$;

the discriminant library is pre-constructed based on the feature centroid $O_i$ of the category i; and the feature centroid $O_i$ is calculated from a feature of the category i; and the substitutive centroid $O'_i$ is expressed as:

$$O'_i = (1-\gamma)O_i + \gamma M,$$

where an update coefficient $\gamma$ is less than 1 and greater than 0.

11. The device according to claim 10, further comprising: a feature extracting subunit, a calculating unit, a plane obtaining unit, a dividing unit, a constructing unit and a determining unit, wherein
the feature extracting subunit is configured to extract features of n categories of a valuable document, wherein each of the n categories comprises one or more features, and n is greater than 1;
the calculating unit is configured to calculate the feature centroid $O_i$ of the category i based on the features of the category i;
the plane obtaining unit is configured to obtain a relative discriminant plane group of the category i based on the feature centroid $O_i$, wherein the relative discriminant plane group of the category i is composed of relative discriminant planes of the category i relative to the other n−1 categories, and a relative discriminant plane $l_{i\eta}$ of the category i relative to a category $\eta$ satisfies that the relative discriminant plane $l_{i\eta}$ is perpendicular to a connection line between the feature centroid $O_i$ of the category i and a feature centroid $O_\eta$ of the category $\eta$;
the dividing unit is configured to divide valuable documents of the category i and the category $\eta$ to the two sides of the plane, wherein all valuable documents of the category i are located on a positive side of the relative discriminant plane $l_{i\eta}$, all valuable documents of the category $\eta$ are located on a negative side of the relative discriminant plane $l_{i\eta}$, and a minimum value of distances between valuable documents of the category i and the relative discriminant plane $l_{i\eta}$ is smaller than a minimum value of distances between valuable documents of the category $\eta$ and the relative discriminant plane $l_{i\eta}$, and i is not equal to $\eta$;
the constructing unit is configured to build a discriminant sphere of the category i with a radius $R_i$, wherein $R_i$ is determined by the feature centroid $O_i$ and the relative discriminant plane group of the category i; and
the determining unit is configured to determine an intersecting area between the relative discriminant plane group of the category i and the discriminant sphere of the category i as a discriminant library of the category i.

12. The device according to claim 11, wherein the calculating unit comprises: a feature obtaining unit and a calculating subunit,
the feature obtaining unit is configured to obtain the features of the category i; and
the calculating subunit is configured to calculate an arithmetic mean of the features of the category i as the feature centroid $O_i$.

13. The device according to claim 10, further comprising:
a second determining unit, configured to determine whether the substitutive centroid $O'_i$ satisfies a preset correction condition, and activate the updating unit in a case that the substitutive centroid $O'_i$ satisfies the preset correction condition.

* * * * *